Figure 3:
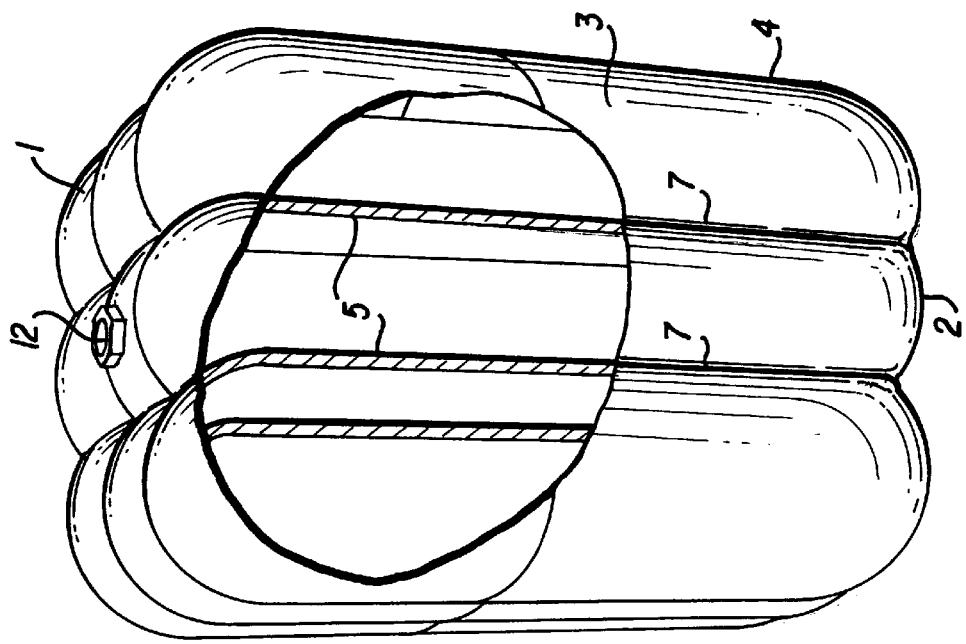

United States Patent
Orlowski

Patent Number: 5,944,215
Date of Patent: Aug. 31, 1999

[54] VESSEL FOR A PRESSURIZED FLUID

[75] Inventor: Witold Orlowski, Helsingborg, Sweden

[73] Assignee: Perstorp AB, Perstorp, Sweden

[21] Appl. No.: 08/913,448

[22] PCT Filed: Mar. 28, 1996

[86] PCT No.: PCT/SE96/00403

§ 371 Date: Sep. 16, 1997

§ 102(e) Date: Sep. 16, 1997

[87] PCT Pub. No.: WO96/30676

PCT Pub. Date: Oct. 3, 1996

[30] Foreign Application Priority Data

Mar. 29, 1995 [SE] Sweden .................................. 9501164

[51] Int. Cl.⁶ .................................................. B65D 90/02
[52] U.S. Cl. ...................... 220/501; 220/565; 220/564; 220/4.24; 220/4.13
[58] Field of Search ................................. 220/501, 565, 220/564, 560.09, 4.24, 4.25, 4.05, 4.06, 4.07, 526, 581, 507, 584, 506, 553, 555, 4.13, 678

[56] References Cited

U.S. PATENT DOCUMENTS

| | | |
|---|---|---|
| 2,341,044 | 2/1944 | Jackson et al. . |
| 3,215,304 | 11/1965 | Rohe . |
| 4,182,254 | 1/1980 | Secord .................................... 220/564 |
| 4,297,846 | 11/1981 | Cadeddu ................................ 220/526 |
| 5,564,587 | 10/1996 | Falk et al. .............................. 220/501 |
| 5,704,512 | 1/1998 | Falk et al. .............................. 220/501 |

FOREIGN PATENT DOCUMENTS

| | | |
|---|---|---|
| 330292 | 11/1970 | Sweden . |
| 1522609 | 8/1978 | United Kingdom . |

*Primary Examiner*—Stephen Castellano
*Attorney, Agent, or Firm*—Stevens, Davis, Miller & Mosher, L.L.P.

[57] ABSTRACT

A plastic vessel for a pressurized fluid, having an upper end wall and a lower end wall and an intermediate part with an outer wall and internal partition walls. The internal partition walls are placed in such a way in respect of each other and the outer wall that at least two longitudinal compartments for pressurized fluid are formed, which compartments are communicating with each other and run between the end walls. The vessel is non-circular. The outer wall between each pair of partition walls has a curve, with a radius adapted in such a manner that the tensions arising in the outer wall when the vessel is filled with a pressurized fluid will mainly be transformed solely to tensile stress in the partition walls which are joined to the outer wall. The partition walls are joined to the outer wall in the border lines where two such curves meet.

22 Claims, 4 Drawing Sheets

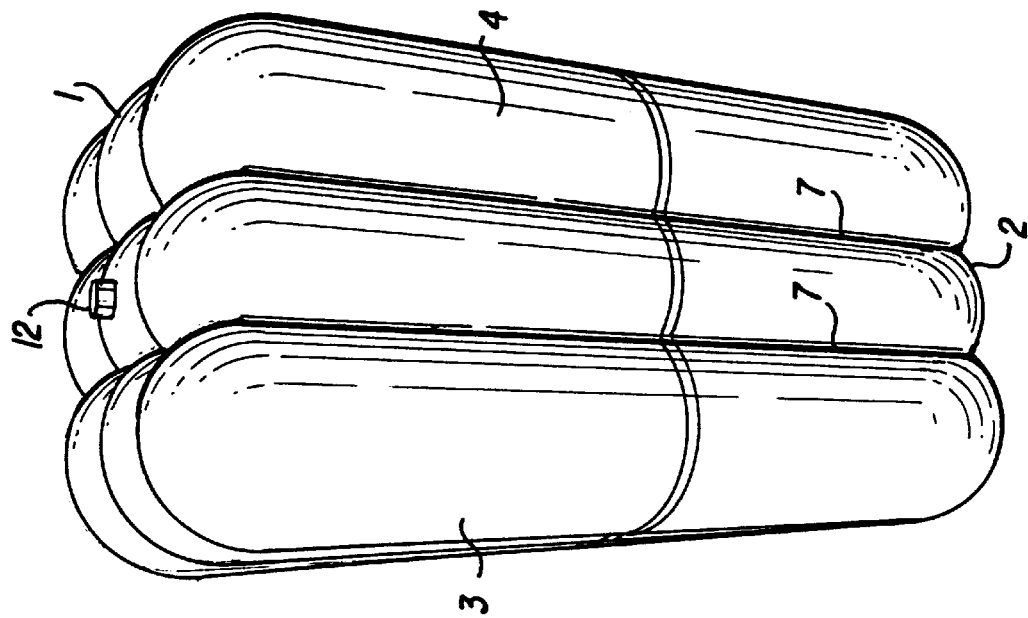
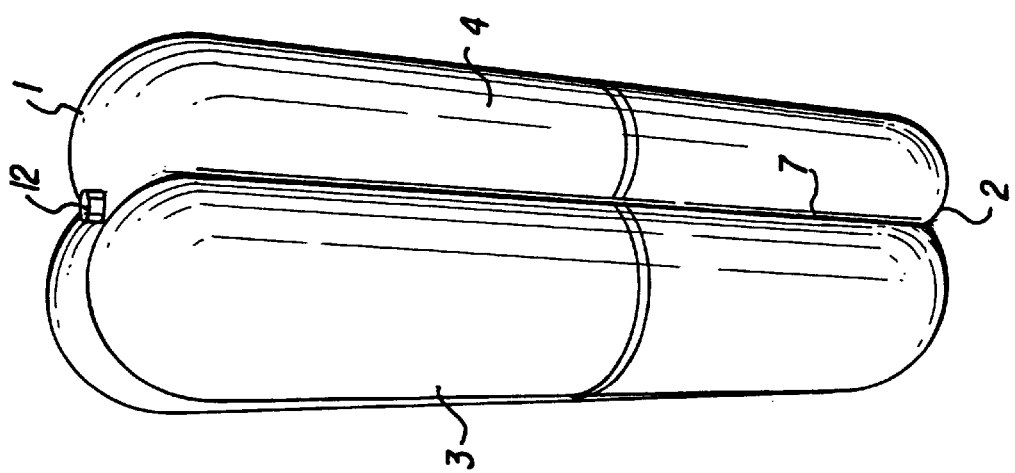

VESSEL FOR A PRESSURIZED FLUID

The present invention relates to a light and strong vessel for a pressurized fluid, arranged to withstand an internal pressure of at least 5 atmospheres. It has an upper end wall and a lower end wall which are both part-spherical and an intermediate part with an outer wall and internal partition walls. The outer wall and the internal partition walls are firmly connected with the end walls and the internal partition walls are placed in such a way in respect of each other and the outer wall that at least two longitudinal compartments for pressurized fluid are formed. These compartments are communicating with each other and run between the end walls.

For a long time it has been considered necessary to design vessels for a pressurized fluid as a cylinder with a circular cross section to make them strong enough to resist the pressure from the pressurized fluid in the vessel. Usually these vessels are made of metal without partition walls.

However, a few other pressure vessels which can have a non circular cross section have been disclosed before, Thus, the old U.S. Pat. No. 2,341,044 shows a container comprising truncated intersecting spherical shell sections. A plate-like partition wall is welded to the adjacent intersecting edges of these sections. The vessel is made of metal and it is very big. It can have a rather square cross section. According to this old invention it is essential that the vessel is made of spherical shell sections, which give a rather flat construction. The compartments in the vessel will be spherical and the volume of the vessel will depend on the seize of the spheres and the number of such spheres.

The known metal vessel has many disadvantages. For instance it will be very heavy. In addition the welding of the partition walls will result in weaker parts in the construction.

Moreover metal vessels have the drawback that the pressure in the vessel will increase when the vessel is heated. This depends on the fact that the fluid stored in the vessel will have a greater volume expansion than the metal vessel. In a plastic vessel the situation will be the opposite since the plastic has a higher volume expansion than the fluid. To avoid that the metal vessel will be destroyed at an increased temperature the thickness of the walls has to be increased which will increase the weight of the vessel even more.

From the U.K. patent 1,522,609 it is known to produce huge metal tanks for ships, which tanks are used for storage of fluid under pressure. The tanks are obtained by welding steel plates together in such a manner that several longitudinal chambers are obtained. These known tanks have the same disadvantages as the vessel according to the above U.S. Pat. No. 2,341,044.

According to the present invention it has been possible to avoid the above disadvantages and bring about a light and strong plastic vessel for a pressurized fluid, arranged to withstand an internal pressure of at least 5 atmospheres. It has an upper end wall and a lower end wall which are both part-spherical and an intermediate part with an outer wall and internal partition walls. The outer wall and the internal partition walls are firmly connected with the end walls and the internal partition walls are placed in such a way in respect of each other and the outer wall that at least two longitudinal compartments for pressurized fluid are formed. These compartments are communicating with each other and run between the end walls. The vessel is characterized in that the partition walls are made in one homogenous part with each other and with the outer wall, that the vessel is non-circular, for example with an essentially triangular, rectangular or polygonal cross-section, that each compartment along the outer wall of the vessel is limited outwards by the outer wall and inwards by one, two or three partition walls of which two make a pair, whereby one end of each wall of such a pair is firmly joined to the outer wall and the other two ends of such a pair are firmly joined to each other or to a third partition wall which in its turn often constitutes a wall in a central compartment which runs between the end walls, is surrounded by peripheral compartments and communicates with these. If there is only one partition wall, its both ends are joined to the outer wall and the vessel is thereby divided in two communicating compartments. The thicknesses of the walls are well adapted to each other and the outer wall between each such pair has a curve, preferably a circular arc with a radius adapted in such a manner that the tensions arising in the outer wall when the vessel is filled with a pressurized fluid will mainly be transformed solely to tensile stress in the partition walls which are joined to the outer wall. The partition walls are joined to the outer wall in the border lines where two such curves meet, and the angle between such partition walls and each of these curves is mainly the same.

Often the vessel has a mainly rectangular cross section instead of a normally circular one.

Sometimes the vessel contains one or two central compartments surrounded by peripheral compartments. This depends on the size and the form of the cross section.

Thus, central compartments are usually needed at larger cross sections if a vessel with a rather flat outer side is desired.

Since the outer wall as mentioned above has a curve and the thicknesses of the walls are well adapted to each other the vessel according to the invention can be produced of a considerably less amount of material than if such an adaption had not been made. The amount of material will come close to substantially the same amount of material needed for an ideal cylinder having the same inner volume but lacking corresponding division into compartments by means of partition walls.

Preferably, the central compartment or compartments have an essentially triangular, rectangular or polygonal cross section.

The vessel has an ordinary opening at the top and/or at the bottom, which opening is provided with a valve or a connection.

Many different thermoplasts such as polyacetal, polyamide, polyethylene terephthalate, polybutylene terephthalate, polyethylene, polypropylene, polybutylene, polyvinyl chloride and polycarbonate or a thermosetting resin such as epoxy resin, polyester resin, phenol-formaldehyde resin or polyimide resin can be used for the production of the vessel. The plastic can contain fiber formed fillers such as carbon fibers, glass fibers, polyimide fibers or the like.

Depending on the specific design, the material and the size of the vessel it can as mentioned above withstand an inner pressure of at least 5 atmospheres, preferably at least 15 atmospheres and often 15–25 atmospheres.

Usually the vessel has a volume of less than 2 m$^3$, preferably 10–500 liters. Often the vessel is rather small, 10–200 liters.

The vessel can be made in many different ways. Accordingly, the end walls can be manufactured by injection moulding, preferably with integrated partition walls and the intermediate part by injection moulding or extrusion with integrated partition walls, whereupon the parts are joined by means of mirror welding for instance.

The vessel can also be made of two parts with integrated partition walls, which parts are then joined by mirror welding for instance. In this case the two parts can be made by injection moulding or the like.

It is also possible to make the vessel directly in one piece for instance by means of a melt core technique.

Due to the special design according to the invention, handles and the like can easily be integrated in the construction by using the border lines where the outer wall and the partition walls meet as fixing points.

The pressure vessel according to the invention can for instance be used as a water heater, pressure tanks for vehicles, fire extinguishers, containers for bottled gas and compressors.

Figure 4:
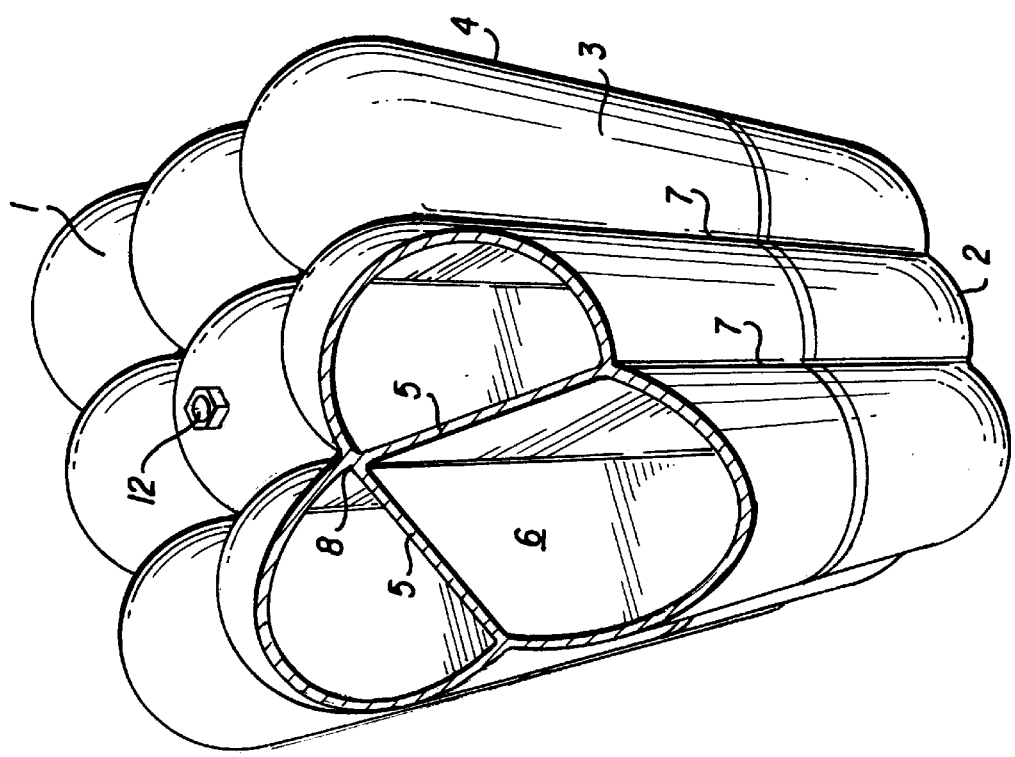
Figure 5:
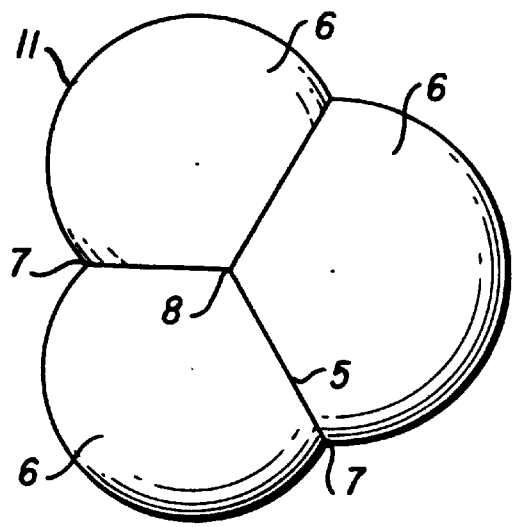
Figure 6:
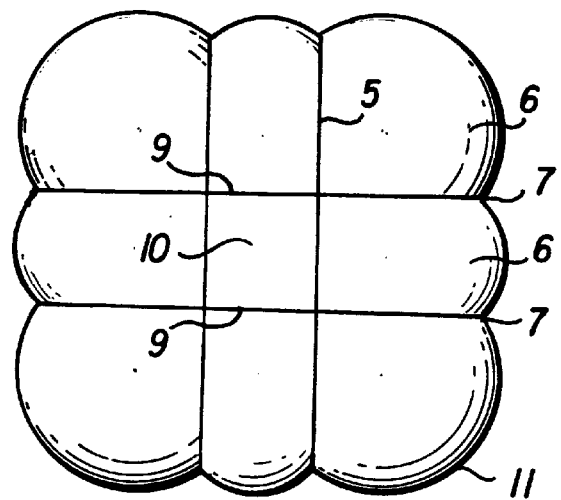
Figure 7A:
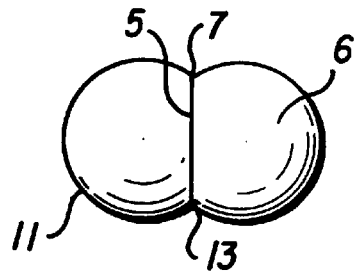
Figure 7B:
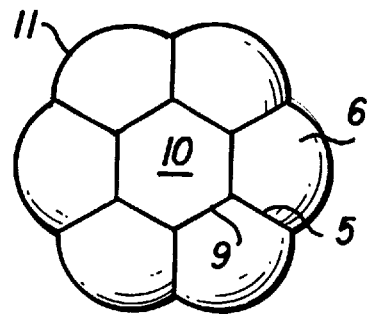
Figure 7C:
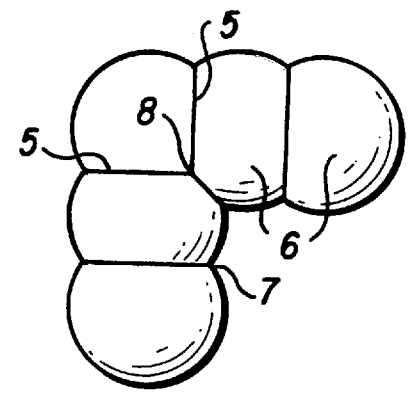
Figure 7D:
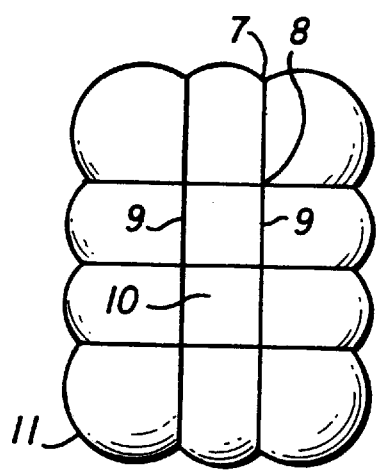
Figure 7E:
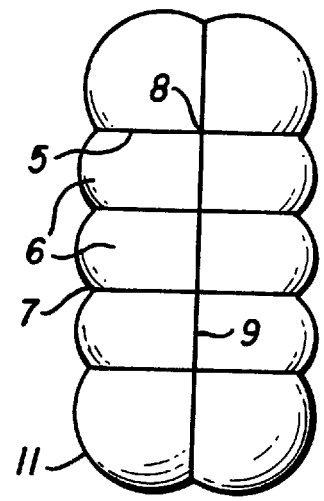

The invention is further explained in connection with the enclosed figures of which FIG. 1 in perspective shows one embodiment of a pressure vessel according to the invention with mainly triangular cross section. FIG. 2 illustrates in a perspective view another embodiment of a pressure vessel with mainly square cross-section. FIGS. 3 and 4 show a perspective view of the same pressure vessel as according to FIG. 2 but some parts have been cut away to show the inside of the vessel. FIG. 5 shows a cross section of the vessel according to FIG. 1 and FIG. 6 shows a cross section of the vessel according to FIGS. 2–4.

FIG. 7A–7E illustrates examples of other suitable cross sections of the pressure vessel according to the invention.

The pressure vessel comprises an upper end wall 1, a lower end wall 2 and an intermediate part 3 with an outer wall 4.

The vessel according to FIGS. 1 and 5 have three internal partition walls 5, placed in such a manner in respect of each other and to the outer wall 4 that three compartments 6 for a pressurized fluid are formed running between the end walls 1, 2. The compartments 6 have a communication between them obtained by one or more openings or holes in the partition walls 5. The outer wall 4 is formed as a circular arc between each pair of partition walls. At the top the vessel has an opening with a valve 12.

The vessel according to FIGS. 2, 3, 4 and 6 has got eight internal partition walls 5 and four internal walls 9 placed in such a manner in respect of each other and to the outer wall 4 that eight peripheral compartments and one central compartment for pressurized fluid are formed running between the end walls 1, 2. The compartments 6 and 10 have a communication between them obtained by one or more openings or holes in the partition walls 5 and 9. The outer wall 4 is formed as a circular arc between each pair of partition walls 5. The central compartment 10 is limited by the four partition walls 9. At the top the vessel is provided with an opening with a valve 12.

One end 7 of each wall 5 of a pair of partition walls 5 is firmly joined to the outer wall 4 and the other two ends 8 of such a pair are firmly joined to each other or to a third partition wall 9.

FIG. 7A–7E illustrates cross sections of other embodiments of a pressure vessel according to the invention with two to twelve communicating compartments.

The invention is not limited to the embodiments shown, since these can be modified in different ways within the scope of the invention.

I claim:

1. A light and strong plastic vessel for a pressurized fluid, said vessel comprising an intermediate part arranged to withstand an internal pressure of at least 5 atmospheres, said intermediate part comprising an outer wall and longitudinal internal partition walls, said vessel further comprising an upper end wall and a lower end wall which are both part-spherical integral with said intermediate part, which outer wall and internal partition walls are firmly connected with said upper and lower end walls and the internal partition walls are placed in such a way in respect of each other and the outer wall that at least two longitudinal compartments for pressurized fluid are formed, at least two of the compartments being in fluid communication with each other, and run between the upper and lower end walls, wherein the partition walls and outer walls are formed in one homogenous part with each other, and form two substantially identical portions of the intermediate part which portions are welded together to form said intermediate part which, together with the upper and lower end walls define a vessel which is non-circular in cross-section, with a cross-section selected from the group consisting of square, triangular, rectangular and polygonal.

2. Vessel according to claim 1, wherein the vessel it has a mainly square cross section.

3. Vessel according to claim 1 wherein the vessel it contains at least one central compartment (10) surrounded by peripheral compartments (6).

4. Vessel according to claim 3, wherein the vessel the central compartment or compartments (10) have an essentially triangular, rectangular or polygonal cross-section.

5. Vessel according to claim 3, wherein the vessel contains two central compartments surrounded by peripheral compartments.

6. Vessel according to claim 1, wherein the vessel it is constituted made of substantially the same amount of material as an ideal cylinder having the same inner volume but lacking corresponding division into compartments by means of partition walls.

7. Vessel according to claim 1, wherein the vessel it has an ordinary opening at the top or at the bottom, which opening is provided with a valve or a connection.

8. Vessel according to claim 1, wherein the vessel is made of a thermoplastic selected from the group consisting of polyacetal, polyamide, polyethylene terephthalate, polybutylene terephthalate, polyethylene, polypropylene, polybutylene, polyvinyl chloride and polycarbonate.

9. Vessel according to claim 7, wherein the thermoplastic contains fillers in the form of fibrous reinforcement.

10. Vessel according to claim 7 wherein the fibrous fillers are at least one fiber selected from the group consisting of carbon fibers, glass fibers and polyimide fibers.

11. Vessel according to claim 1, wherein the vessel it is arranged to withstand an inner pressure of at least 15 atmospheres.

12. Vessel according to claim 1, wherein the end walls are formed by injection moulding and the intermediate part by injection moulding or extrusion, whereupon the parts are joined.

13. Vessel according to claim 1, wherein the vessel it is made in two parts with integrated partition walls which parts are then joined by mirror welding.

14. Vessel according to claim 11, wherein the vessel it is formed by injection moulding.

15. Vessel according to claim 1, wherein the compression strain arising in the outer wall upon pressurizing said vessel is mainly transformed to tensile stress.

16. Vessel according to claim 1 wherein it is made of a thermosetting resin.

17. Vessel according to claim 16 wherein the thermosetting resin is selected from the group consisting of epoxy resin, polyester resin, phenol-formaldehyde resin and polyimide resin.

18. Vessel according to claim 16 wherein the resin contains fillers in fibrous form.

19. Vessel according to claim 18 wherein the fibrous fillers are at least one fiber selected from the group consisting of carbon fibers, glass fibers and polyimide fibers.

20. Vessel according to claim 1, wherein the outer wall is curved between adjacent partition walls wherein said curve is a circular arc having a radius adapted such that the tensions arising in the outer wall upon pressurizing said vessel will be transformed solely to tensile stress in the partition walls.

21. Vessel according to claim 1, wherein said vessel has a mainly rectangular cross-section.

22. Vessel according to claim 1, wherein said vessel has a mainly polygonal cross-section.

* * * * *